(12) United States Patent
Wolfson et al.

(10) Patent No.: US 6,970,109 B2
(45) Date of Patent: Nov. 29, 2005

(54) KEYBOARD MODIFICATION SYSTEM

(75) Inventors: Stanley J. Wolfson, Denver, CO (US); Daniel H. Ross, Highlands Ranch, CO (US)

(73) Assignee: Clancy Systems International, Inc., Denver, CO (US)

(*) Notice: Subject to any disclaimer, the term of this patent is extended or adjusted under 35 U.S.C. 154(b) by 699 days.

(21) Appl. No.: 10/199,377

(22) Filed: Jul. 19, 2002

(65) Prior Publication Data

US 2004/0012508 A1    Jan. 22, 2004

(51) Int. Cl.[7] ............... H03K 17/94; H03M 11/00
(52) U.S. Cl. ............... 341/22; 361/686; 400/717
(58) Field of Search ............... 341/22; 361/680, 361/683, 686; 400/472, 717

(56) References Cited

U.S. PATENT DOCUMENTS

| | | |
|---|---|---|
| 3,940,758 A | 2/1976 | Margolin |
| 4,517,660 A | 5/1985 | Fushimoto et al. |
| 4,939,514 A | 7/1990 | Miyazaki |
| D331,400 S | 12/1992 | Kelly et al. |
| D332,777 S | 1/1993 | Kelly et al. |
| 5,187,644 A | 2/1993 | Crisan |
| 5,515,305 A | 5/1996 | Register et al. |
| 5,548,477 A | 8/1996 | Kumar et al. |
| 5,574,481 A | 11/1996 | Lee |
| 5,638,257 A | 6/1997 | Kumar et al. |
| 5,644,338 A | 7/1997 | Bowen |
| 5,675,524 A | 10/1997 | Bernard |
| 5,708,560 A | 1/1998 | Kumar et al. |
| 5,745,056 A | 4/1998 | Takahashi et al. |
| 5,786,983 A | 7/1998 | Brenner et al. |
| 5,790,103 A | 8/1998 | Willner |
| 5,890,016 A | 3/1999 | Tso |
| 5,941,648 A | 8/1999 | Robinson et al. |
| 6,108,200 A | 8/2000 | Fullerton |
| 6,147,858 A | 11/2000 | Takahashi |
| 6,154,759 A | 11/2000 | Chou |
| 6,168,331 B1 | 1/2001 | Vann |
| 6,174,097 B1 | 1/2001 | Daniel |
| 6,396,482 B1 * | 5/2002 | Griffin et al. ............... 345/169 |
| 6,774,888 B1 * | 8/2004 | Genduso ............... 345/168 |
| 6,785,126 B2 * | 8/2004 | Hazzard et al. ............... 361/680 |
| 6,914,776 B2 * | 7/2005 | Kim ............... 361/683 |
| 2002/0186525 A1 * | 12/2002 | Singh ............... 361/680 |
| 2002/0191999 A1 * | 12/2002 | Katz ............... 400/472 |
| 2003/0006968 A1 * | 1/2003 | Solomon ............... 345/168 |
| 2003/0011971 A1 * | 1/2003 | Suzuki et al. ............... 361/680 |
| 2003/0157961 A1 * | 8/2003 | Glover ............... 455/557 |
| 2004/0005184 A1 * | 1/2004 | Kim et al. ............... 400/472 |
| 2004/0067086 A1 * | 4/2004 | Olodort et al ............... 400/472 |

* cited by examiner

*Primary Examiner*—Timothy Edwards, Jr.
(74) *Attorney, Agent, or Firm*—Lawrence N. Ginsberg

(57) ABSTRACT

The keyboard modification system includes: a looping module; a keycode processing module; a determining module; and, at least one additional keycode processing module. The looping module checks for the existence of incoming data from a communication port of a PDA and provides a keycode data output therefrom. A keycode processing module receives the keycode data output from the looping module and translates the data into variable data. A determining module determines whether a key on a keyboard of a portable keyboard assembly has remained depressed and if not continues to check for the existence of the variable data and translate the variable data to a keydata stream. The additional keycode processing module replaces the keydata stream with a different keydata stream if the key has remained depressed.

5 Claims, 7 Drawing Sheets

KEYBOARD MODIFICATION SYSTEM

CROSS-REFERENCE TO RELATED APPLICATIONS

This invention is related to the patent application entitled Portable Keyboard Assembly, of co-applicant Stanley J. Wolfson, filed concurrently herewith.

BACKGROUND OF THE INVENTION

1. Field of the Invention

This invention relates to accessories for personal digital assistants (PDAs) and more particularly to a keyboard accessory for a PDA.

2. Description of the Related Art

Pen-based PDAs have grown in popularity for several reasons, chief amongst them being their small size and easy portability. Miniaturization of electronic components has made these devices increasingly powerful, versatile and affordable. Many users, however, find the two available stylus data-entry methods cumbersome and prone to errors. PDAs commonly rely on this stylus as a means for data entry. This involves tapping on an "on-screen software keyboard" or handwriting on a pressure-sensitive layer. The tapping method is typically slow, and the small screen area of PDAs increases the likelihood that a user will inadvertently make unintended selections. The handwriting recognition method affords the user greater flexibility and ease of use over the tapping method for composing messages and entering data, but handwriting recognition has its own set of limitations. The character recognition programs at the heart of these handwriting recognition methods often need to learn the handwriting of the user in order to be effective. Many users do not have the time or patience to bring their pen-based computer through this learning process. Even those users, that do train their pen-based computers to recognize their handwriting, find that mistakes are unavoidable since the art of handwriting recognition is far from perfect. Further, a pen-based computer trained to recognize one individual's handwriting will not function well if transferred to a second user, and may never function well if several users routinely use it.

There have been various attempts to provide suitable accessory keyboards to accommodate PDAs. For example, U.S. Pat. No. 6,108,200 issued to R. L. Fullerton, discloses a computer keyboard system that involves the user of a relatively large keyboard. A cover folds down over the keyboard; however, the cover and keyboard are substantially larger than the PDA, thus reducing the small size and easy portability advantages of using these PDAs. In one embodiment disclosed in the '200 patent, a smaller keypad is disclosed; however, that smaller keypad only includes the 10-key layout frequently used for inventory control. Furthermore, the '200 device requires the use of batteries and the PDA must be removed when not in use.

U.S. Pat. No. 6,147,858, issued to K. Takahashi, discloses another keyboard system. However, the keyboard disclosed is substantially smaller than the PDA and would not serve to protect it when in a stowed position. Furthermore, the Takahashi device has a limited number of keys and the PDA rests in the device. It is not locked in place.

U.S. Pat. No. 6,174,097, issued to S. R. Daniel, discloses a collapsible keyboard that is collapsible between a deployed configuration in which the keyboard is generally planar and a collapsed configuration, the keyboard being foldable about three substantially parallel axes between the deployed and collapsed configurations. The keyboard has four rigid subframes for supporting keys, each subframe being pivotally connected at a folding axis to an adjacent subframe. The keyboard preferably has support frames supporting keys thereon. The keys are slidable and are connected by flexible connectors that span the axes. The keyboard can be locked in either the collapsed or deployed configuration and can be combined with a remote communication unit. Due to it's collapsible nature the '097 device is not hand-held and cannot, for example, be supported on a lap.

Other full-size, or almost full-size, keyboards are conveniently available by several manufacturers' accessories, such as Palm, Outside the Box, GoType, Fellows, and others Generally, these accessory keyboards use the standard QWERTY configuration and need to rest on a flat surface in order for the user to use the keyboard with both hands. Often the accessory keyboard needs to be removed from the PDA when transported or not in use.

In attaching a portable keyboard assembly to a PDA one is presented with the problem of exclusively disabling the serial port of the PDA and exclusively enabling it as is desired. It is desired to provide the automatic enabling and disabling of the serial port without requiring user intervention required to accomplish this. To accomplish this, the designer of a keyboard modification system must be able to effectively patch into the operating system of the PDA. Additionally, if it is desired to utilize a keyboard modification system for use with a keyboard assembly having the capability of producing the characters that are produced by a conventional QWERTY keyboard (i.e. more than 150 characters), a significant design challenge is presented.

SUMMARY

In a broad aspect, the keyboard modification system for a portable keyboard assembly used with a personal data assistant (PDA), includes: a looping module; a keycode processing module; a determining module; and, at least one additional keycode processing module. The looping module checks for the existence of incoming data from a communication port of a PDA and provides a keycode data output therefrom. A keycode processing module receives the keycode data output from the looping module and translates the data into variable data. A determining module determines whether a key on a keyboard of a portable keyboard assembly has remained depressed and if not continues to check for the existence of the variable data and translate the variable data to a keydata stream. The additional keycode processing module replaces the keydata stream with a different keydata stream if the key has remained depressed.

DETAILED DESCRIPTION OF THE INVENTION

Figure 1:
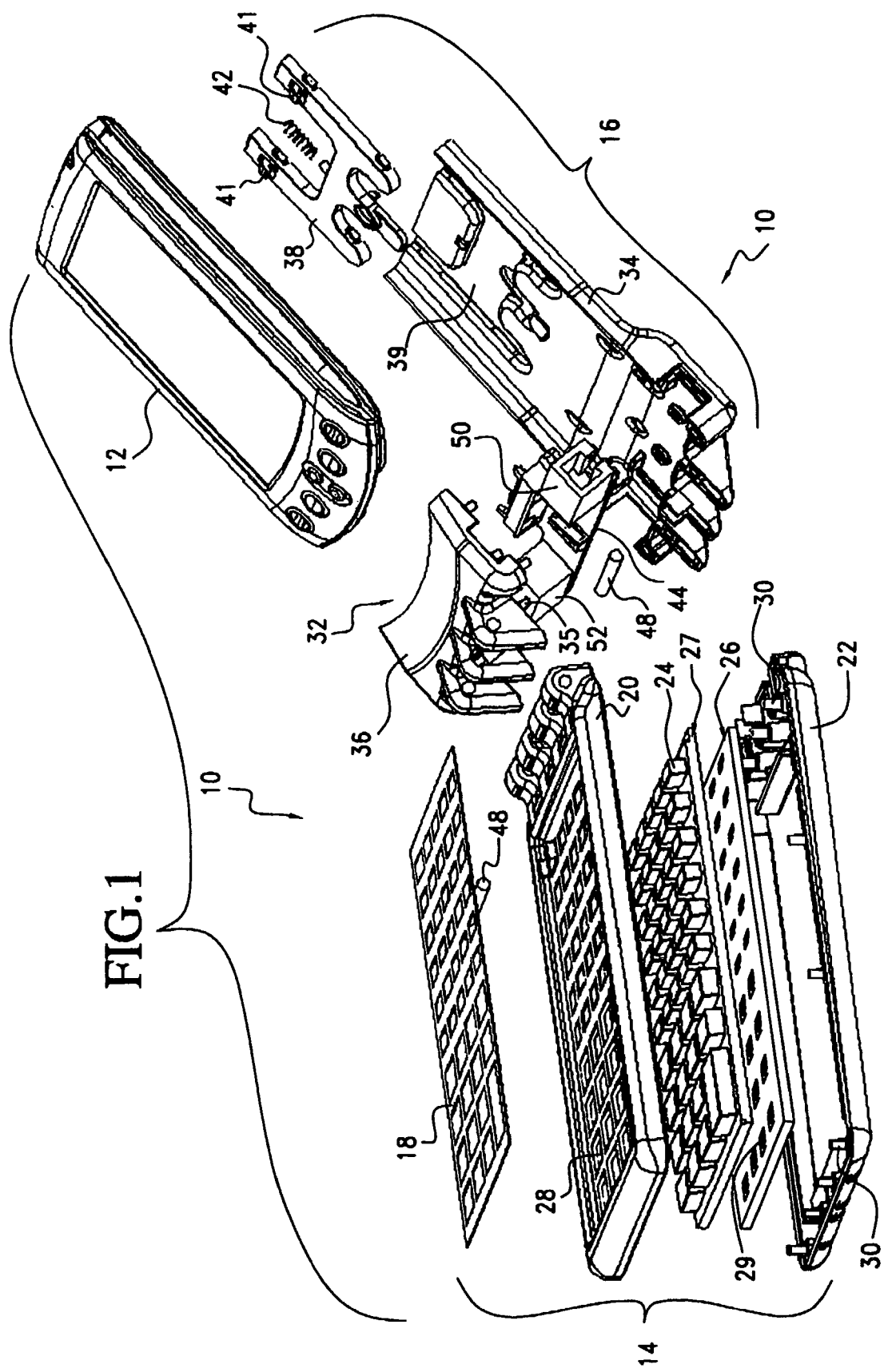
FIG. 1 is an exploded perspective view of the portable keyboard assembly of the present invention.

Referring now to the drawings and to the characters of reference marked thereon, FIG. 1 illustrates a preferred embodiment of the present invention, designated generally as 10 and a PDA 12. The portable keyboard assembly 10 includes a keyboard subassembly, designated generally as 14 and a PDA housing assembly designated generally as 16, pivotally connected to the keyboard subassembly 14. The keyboard subassembly 14 includes a keyboard case assembly 18, 20, 22 and a printed circuit board (PCB) assembly 24, 26, 27, 29. The keyboard case assembly components include a bottom housing 22 and a top housing 20 securely connected to the bottom housing 22. The PCB assembly 24, 26, 27 is securely positioned in a volume formed between the top housing 20 and the bottom housing 22. The top housing 20 has openings 28 for providing access for keyboard keys 24 of the PCB assembly. The top housing 20 and bottom housing 22 are bonded together via tabs 30 on the bottom housing 22 and associated openings in the top housing 28. The keyboard case assembly also includes a key overlay element 18 positioned over the PCB assembly. The element 18 contains key indicia representing key positions. The element 18 may be, for example, pressure sensitive label material, generally polyester.

The PCB assembly includes a PCB board 26 and an elastomeric keyboard 27. The elastomeric keyboard 27 is positioned over the PCB board 26. The elastomeric keyboard 27 includes the keyboard keys 24 thereon. The key overlay element 18 is positioned over the keyboard keys 24. The PCB board 26 has key pad switches 29 on one side and components on the other side. It is programmable and may, for example, and as a preferred embodiment, utilize a programmable microprocessor. The keyboard keys 24 provide primary indicia such as A,B,C, . . . and 1,2,3 . . . . The elastomeric keyboard 27 is preferably formed of silicon and of the type generally used for mobile data entry devices, cell phones, etc. The keyboard is preferably phosphorescent.

The PDA housing assembly 16 includes a PDA support element assembly 32. Assembly 32 includes a bottom support element housing 34 and top support element housing 36 securely connected to the bottom support element housing 34. They are attached via a tab connection 35. A locking element 38 securely attaches the PDA 12 to the PDA support element assembly 32. The bottom support element housing 34 has a recessed area 39 formed therein for supporting the locking element 38. The locking element 38 is slidable up and down the bottom support element housing 34 and lockable therein. It includes two fingers 41 that lock into associated holes in the PDA 12. A spring 42 holds it in a down position when the PDA 12 is locked in place. A PDA connector assembly 44 of the PDA housing assembly 16 is attached to the PDA support element assembly 32 and to the PCB assembly for providing data communication between the PDA keyboard subassembly. The PDA connector assembly 44 is supported between the bottom support element housing 34 and the top support element housing 36 by tabs or fingers 41. Pins 48 provide the hinging attachment of the keyboard subassembly 14 to the PDA housing assembly 16.

Figure 2:
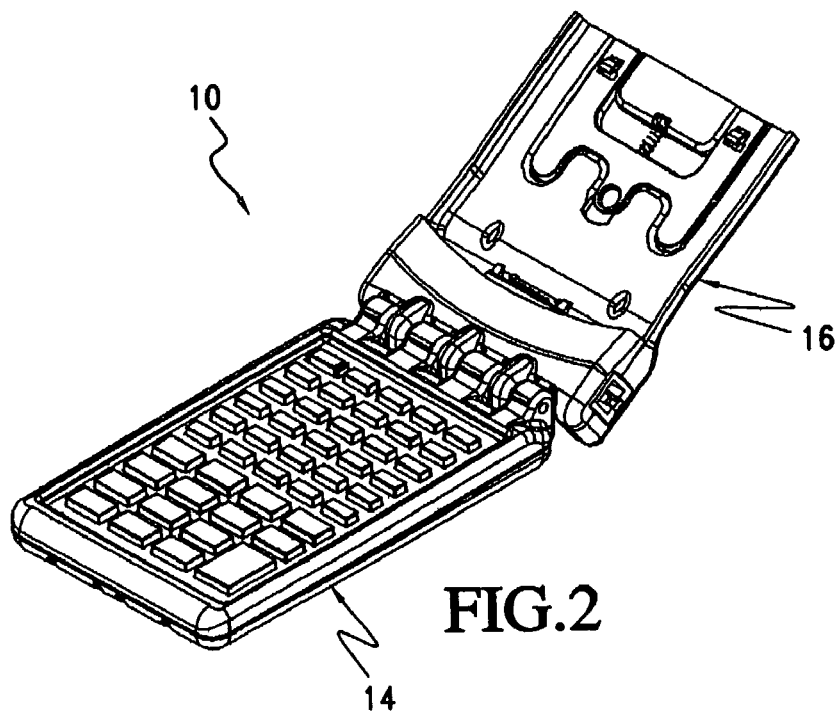
FIG. 2 is a perspective view of the keyboard assembly in an assembled configuration prior to the attachment of the PDA.
Figure 3:
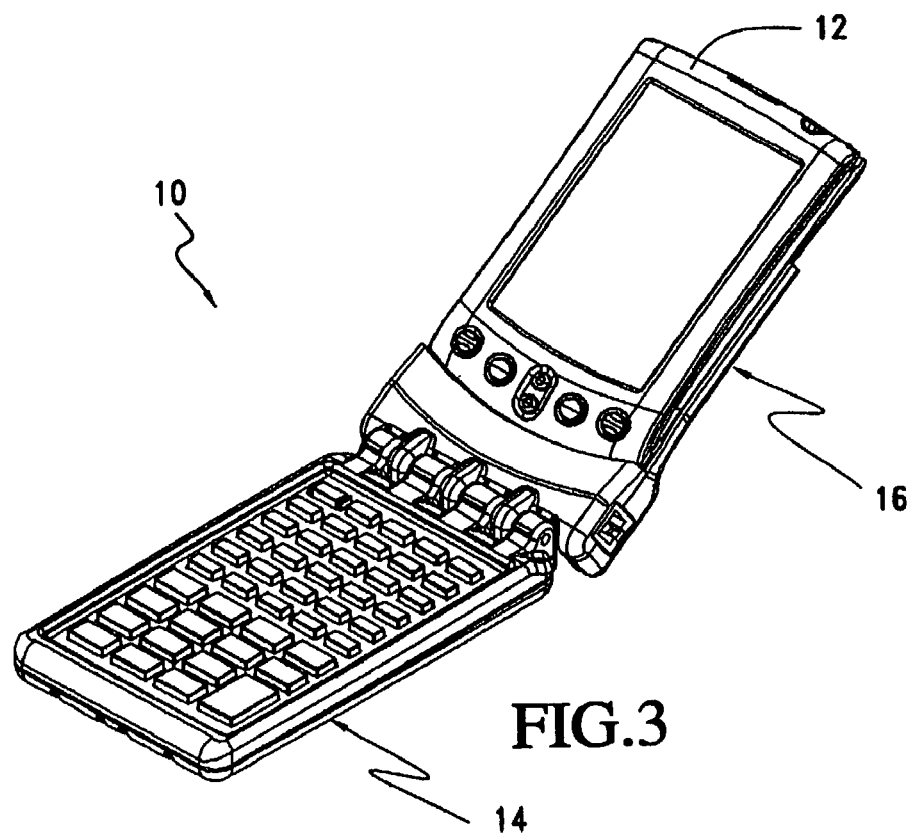
FIG. 3 is a perspective view showing the PDA inserted into the portable keyboard assembly of the present invention, the portable keyboard assembly being in an open, operational position.

FIG. 2 shows the portable keyboard assembly 10 in a fully assembled, open position. Prior to its first time use, the user loads the software driver into the PDA. As can be seen in FIG. 3, the user then inserts the PDA and locks it into place. The keypad can be used to enter information into the PDA.

Figure 4:
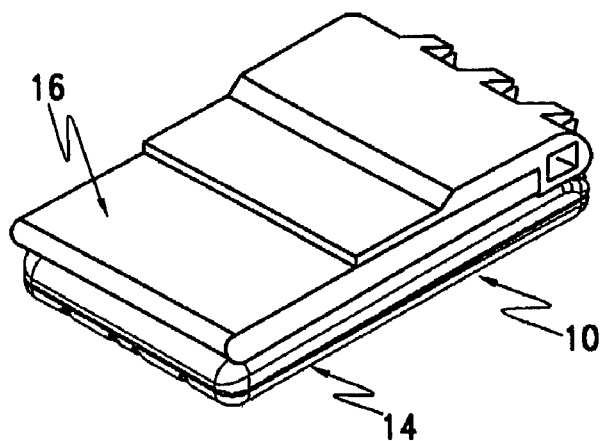
FIG. 4 is another perspective view, showing keyboard assembly and engaged PDA in a stowed position.

FIG. 4 illustrates the portable keyboard assembly 10 in a stowed position. In such a stowed position, the keyboard subassembly 14 is positioned over the PDA, which is secured to the PDA housing assembly. Thus, the keyboard subassembly 14 covers and protects the PDA 12. The portable keyboard assembly 10 in its current preferred embodiment has the following dimensions: In an open position—10.5"×3.4"×0.9" (at its thickest point), and in a closed position—5.9"×3.4"×1.5".

Thus, when a PDA is in place, in a preferred embodiment it has about the same length and width as the newest Palm Pilot brand PDAs, and is only about twice as thick. The keyboard assembly and PDA can fit easily in a man's shirt pocket or a women's purse.

Figure 5:
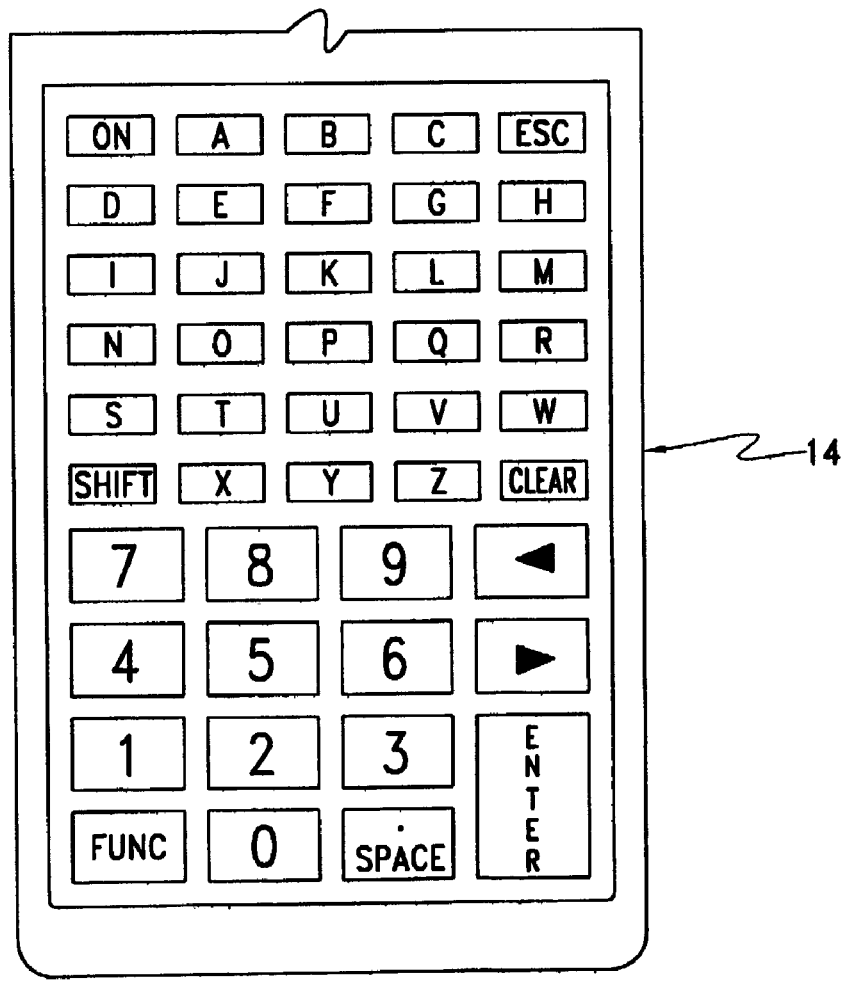
FIG. 5 is a view of the keypad showing the novel arrangement of keys.

Referring now to FIG. 5, it can be seen that the key switch pads are preferably in A-B-C-D arrangement rather than the QWERTY arrangement of most keypads. The A-B-C-D arrangement allows the keyboard to be taller than it is wide, allowing the optimal stowage and protection of the PDA. The key switch pads also include a 10-digit display (i.e. 0–9). The device also preferably includes semi-colon, clear, forward arrow, back arrow, enter, function, space/period, shift, cap lock, and esc. keys. Thus, the present invention is particularly adaptable for use with the sales entry PDA. It is well suited for applications such as inventory control, remote data capture, order entry and other applications which have traditionally been done using portable terminals and not PDAs.

Each key on the keyboard is independently programmable such that the user may associate with each button one or more computer key stroke or key stroke combinations that will be executed when the button is depressed. This allows users to customize their keyboard to streamline repetitive tasks. In the preferred embodiment, the associated computer commands are stored in the PDA memory when the keyboard system is not in use. The preferred embodiment of the present invention draws power from the attached PDA in order to operate the keys of the keypad. It is advantageous to draw power from the PDA as this eliminates the need for an external power supply or batteries and, thus, reduces weight (in a preferred embodiment, the device weighs only about 4.25 oz.) and simplifies the use of the keyboard system. It is further advantageous for the keyboard assembly 10 to draw power from the PDA as this guarantees that the portable keyboard assembly 10 will always operate when the PDA has power. The connector assembly 44 mates with the PDA and passes voltage to the device microprocessor.

The portable keyboard assembly of the present invention does not interfere with the normal operation of the PDA. The PDA can still take input via handwriting recognition and can still take input via the virtual keyboard. All applications will operate as designed as well as accept input via the portable keyboard assembly 10. The present invention is easier to use than handwriting recognition. It requires no user training. It is easier to use than a virtual keyboard. The keys are larger and easier to find and operate.

The portable keyboard assembly 10 has two serial port outlets 50, 52 for connection to a portable printer or other serial device.

Figure 6:
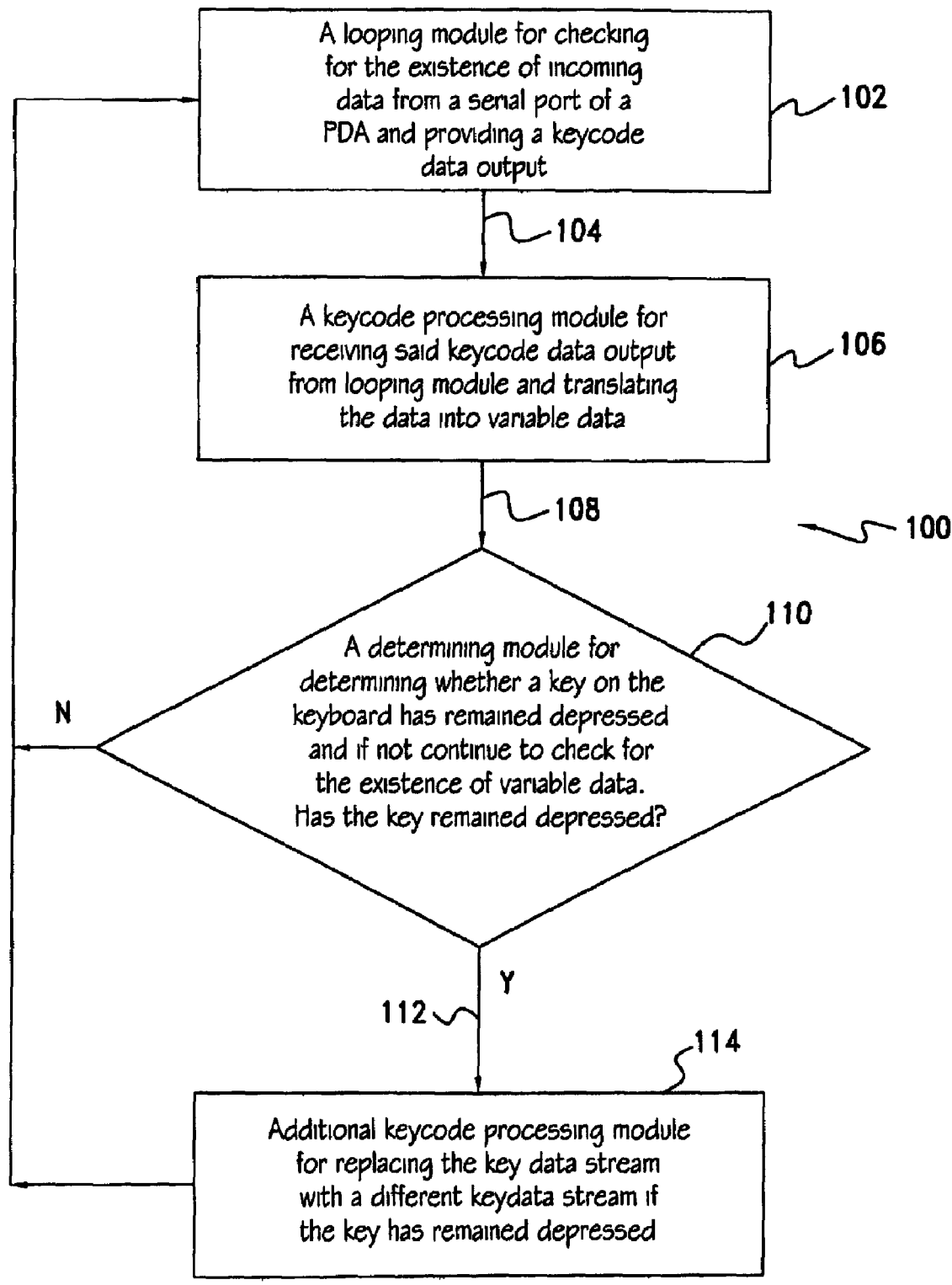
FIG. 6 is an overall flowchart of the keyboard modification system of the present invention.

Referring now to FIG. 6 a flow chart of the keyboard modification system, designated generally as 100, is illustrated which may be used with the portable keyboard assembly 10. The keyboard modification system 100 includes a looping module 102 for checking for the existence of incoming data via, typically the serial port of a PDA (although another communication port may conceivably be used). It provides a keycode data output 104 therefrom. A keycode processing module 106 receives the keycode data output 104 from the looping module and translates the data 104 into variable data 108.

A determining module 110 determines whether a key on a keyboard of the portable keyboard assembly has remained depressed and if not continues to check for the existence of the variable data 108. Variable data is translated to a keydata stream 112. At least one additional keycode processing module 114 replaces the keydata stream 112 with a different keydata stream if the key has remained depressed.

Figure 7:
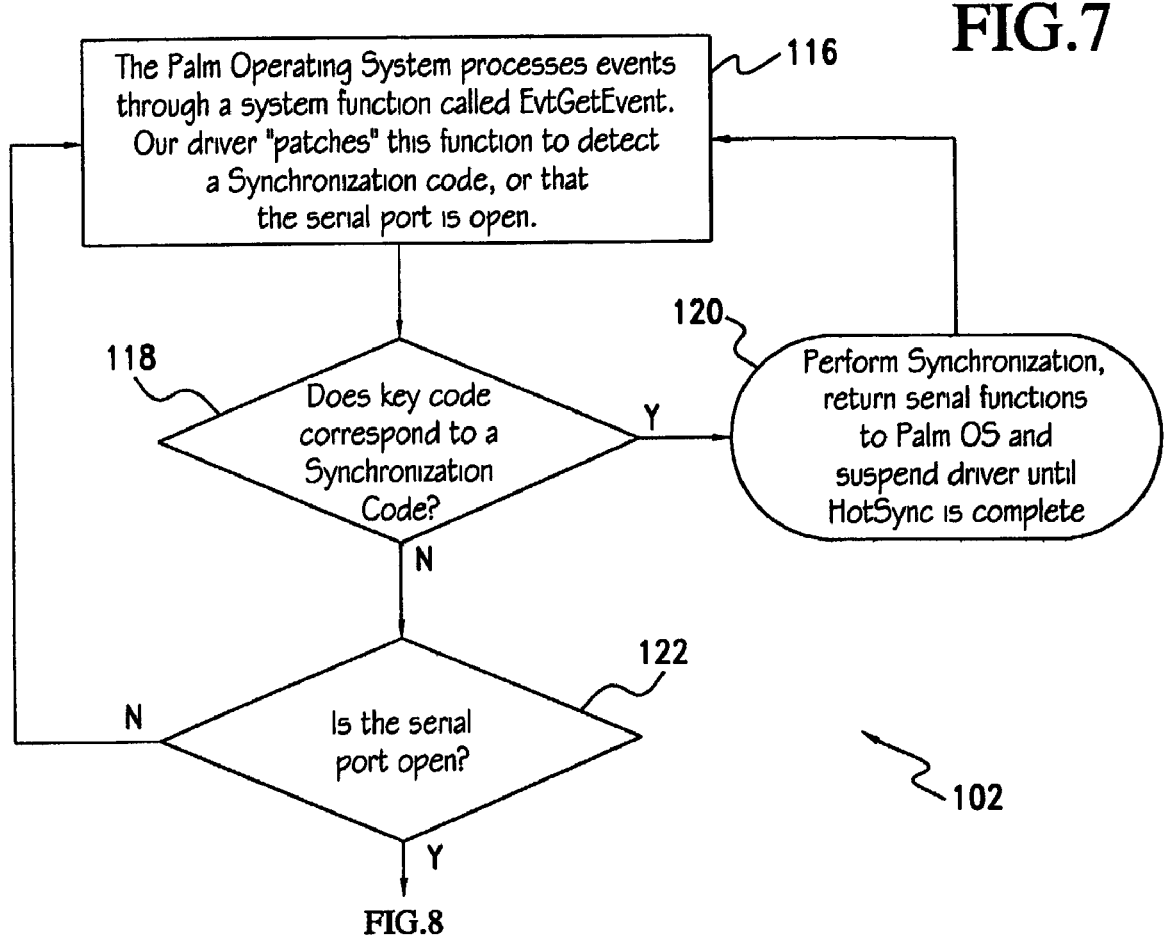
FIG. 7 is a flowchart of the looping module of the keyboard modification system of the present invention.

Referring now to FIG. 7, the function of the looping module 102 is illustrated. First, there is a check for the existence of incoming data from the serial port, as indicated by numeral designation 116. It is noted that the Palm operating system processes events through a system function called EvtGetEvent. The driver of the present invention "patches" this function to detect a synchronization code, or that the serial port is open. Thus, the looping module 102 determines if any incoming data is from the portable keyboard assembly or from a PDA synchronization device, as noted by decision block 118.

The PDA synchronization device is allowed to perform its function if the incoming data was from the PDA synchronization device, as indicated by numeral designation 120. It then continues to check for the existence of incoming data from the serial port. If the data is not from the PDA synchronization device keycode data output is provided and passed to the keycode processing module, if the serial port is open, as noted by decision block 122.

Figure 8:
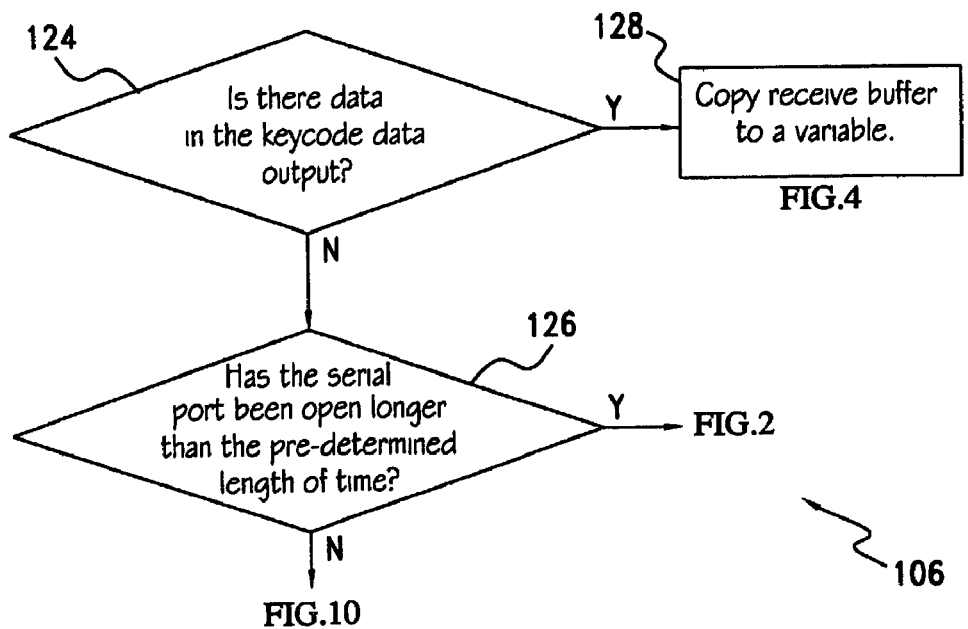
FIG. 8 is a flowchart of the keycode processing module of the keyboard modification system of the present invention.

Referring now to FIG. 8, the keycode processing module 106 is illustrated. A determination (124) is first made as to whether there is data in the keycode data output 104. If there is no data in the keycode data output 104 then a determination is made as to whether the serial port has been open longer than a pre-determined length of time, as shown by decision block 126. Any data in the keycode data output is copied (128) to provide the variable data 108.

Figure 9:
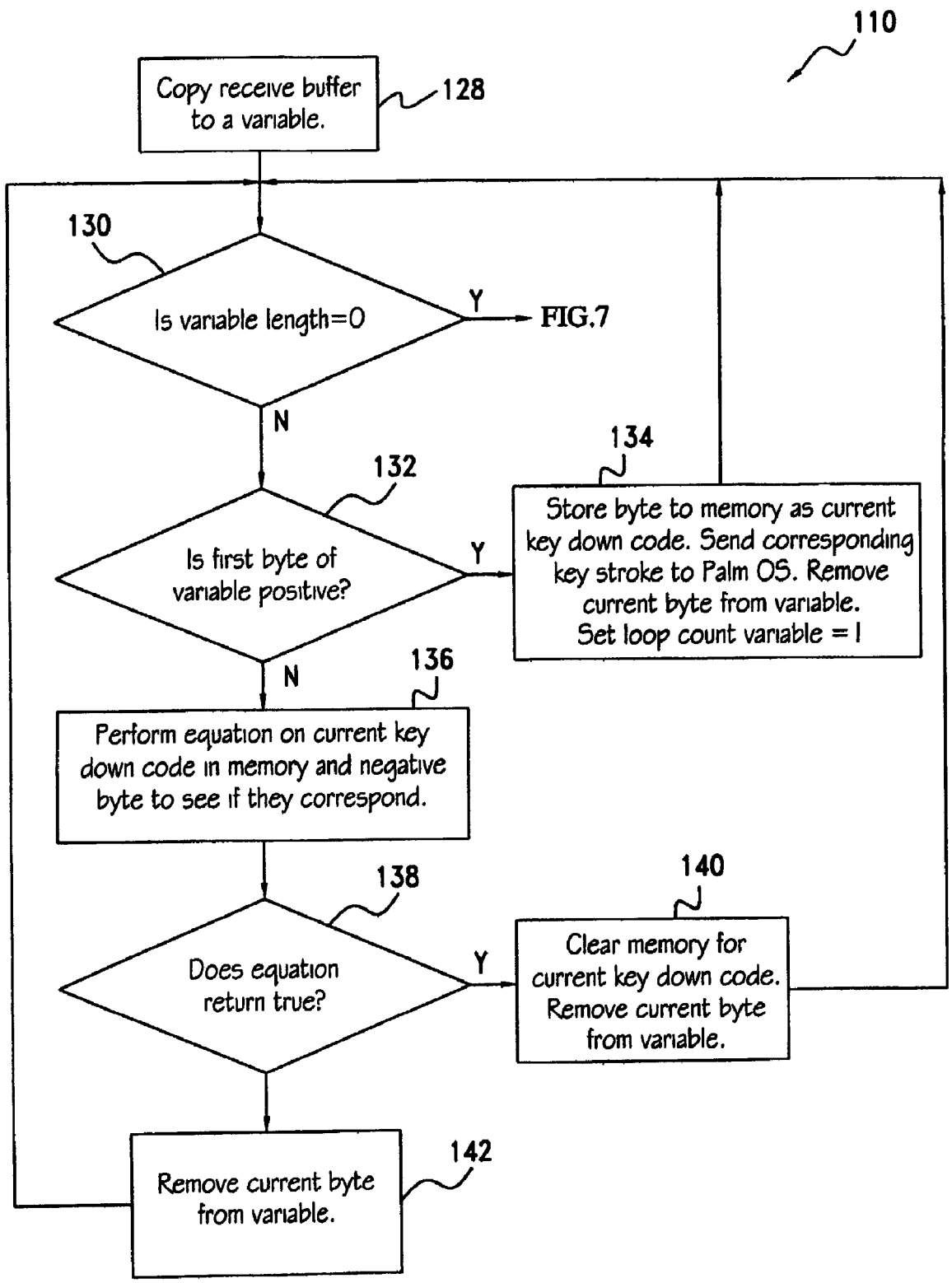
FIG. 9 is a flowchart of the determining module of the keyboard modification system of the present invention.

Referring now to FIG. 9, the determining module 110 is illustrated. The first step of this determining module is to determine whether the length of the variable data 108 is zero (130). If not zero, a determination is made as to whether the first byte of the variable data is positive (decision block 132). If the first byte is positive, the variable data stream is translated to a keydata stream, the current byte is stored to memory as a current key down code, the current byte is removed from the variable data, and the loop count variable is set equal to one (see numeral designation 134).

An equation is performed on the first byte of the variable data if the first byte of the variable data is negative and if the length of the variable data is not zero. The equation determines whether the key has been released (see numeral designation 136). As noted by decision block 138 and block 140, the loop count is reset and the current byte is removed from the variable data if the key has been released. Otherwise the current byte is removed from the variable data without clearing the memory (142).

Figure 10:
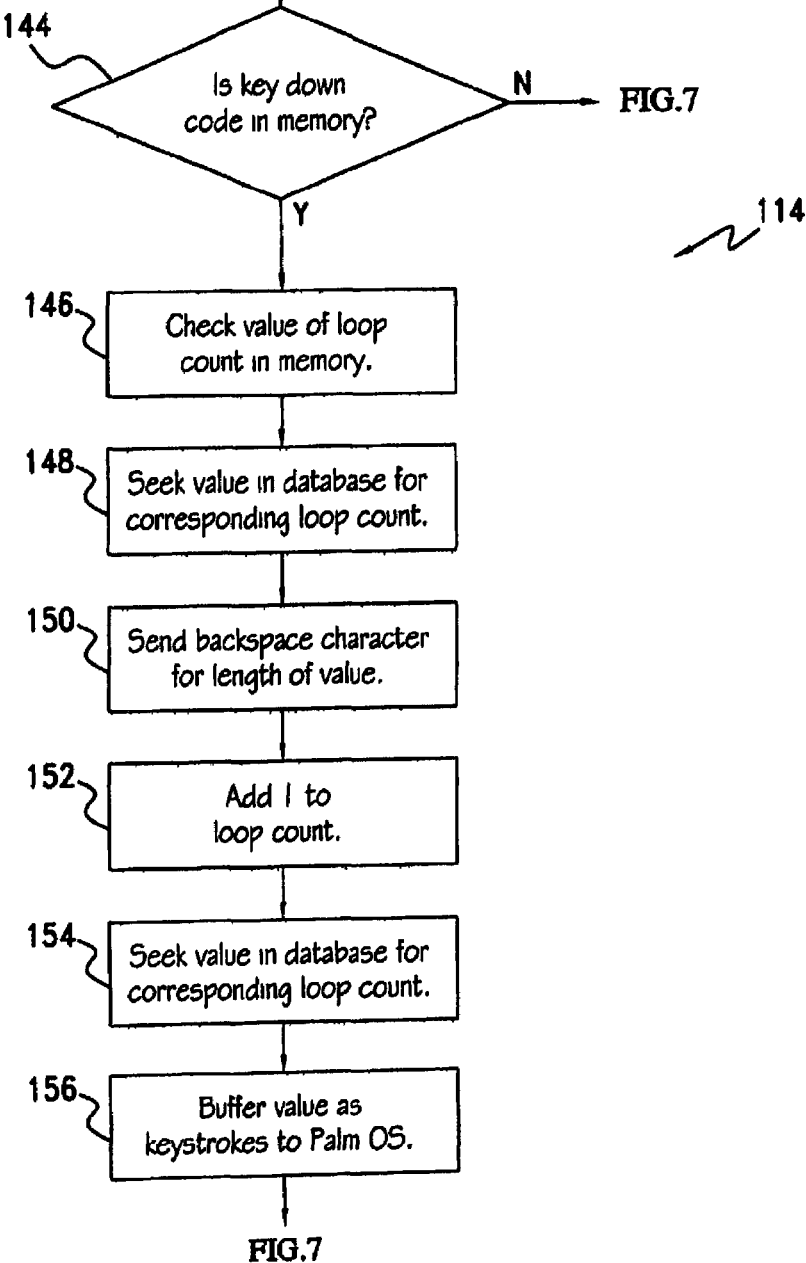
FIG. 10 is a flowchart of the additional keycode processing module of the keyboard modification system of the present invention.

Referring now to FIG. 10, a preferred embodiment of the additional keycode processing module 114 is shown. The first step is checking whether memory exists of the key being depressed. If the key has remained depressed the keydata stream is replaced with a different keydata stream (decision block 144). In such a replacement the value of the loop count in memory is first checked (146). The value in a database for a corresponding loop count is sought (148). A backspace character is sent for each character length of value in the database (150). One is added to the loopcount (152). The value in the database is then sought for the corresponding loop count (154) and the keydata stream is sent out to the PDA (156).

The software allows the user to program up to eight different values for each key on the keypad. Each of these values are triggered by the user holding the corresponding key down for a certain period of time. The amount of time necessary to trigger the next value for the key press is determined by the length of the previous value. The additional keycode processing module 114 function checks to see if a key down code is being held in memory to determine if the physical key is being held.

The keyboard modification system 100 preferably utilizes a C structured language called Code Warrior. The keyboard modification system at its basic level functions just as a keyboard. A challenge was to be able to produce keystrokes that do not have a physical key on the keypad. This problem was solved by a allowing the user to program multiple keystrokes and small character strings for each physical key.

For example, the "D" key on the keyboard could be programmed to display "Dinner Time" on the first loop, then "Driving Instructions" on the next loop. Once the user has programmed the keys the keyboard modification system will loop and replace for each entry as long as the key remains depressed. A good example of this would be if someone is typing under the Palm program Memo Pad. While he is typing, pressing the D key will just produce a D keystroke, but if he holds down the D key the original D will be replaced by "Dinner Time" after a couple of seconds, then "Dinner Time" will be replaced by "Driving Instructions" if he continues to hold down the key.

The present invention may be used for a great many applications, including, but not limited to the following: sales entry, inventory control entry, field maintenance, rental car applications, law enforcement, route management, medical information systems, warehouse management systems, education, logistics, healthcare, education, hospitality, gaming, retail, manufacturing, point of sale, cashiering, and checkout.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A keyboard modification system for a portable keyboard assembly used with a personal data assistant (PDA), comprising:
   a) a looping module for checking for the existence of incoming data from a communication port of a PDA and providing a keycode data output therefrom;
   b) a keycode processing module for receiving said keycode data output from said looping module and translating said data into variable data;
   c) a determining module for determining whether a key on a keyboard of a portable keyboard assembly has remained depressed and if not continue to check for the existence of said variable data and translate said variable data to a keydata stream; and, d) at least one additional keycode processing module for replacing said keydata stream with a different keydata stream if the key has remained depressed.

2. The keyboard modification system of claim 1, wherein said looping module comprises the computer implementable steps of:

a) checking for the existence of incoming data from the communication port;

b) determining if any incoming data is from the portable keyboard assembly or from a PDA synchronization device;

c) allowing the PDA synchronization device to perform its function if the incoming data was from the PDA synchronization device, then returning to step a);

d) providing a keycode data output if the data is not from the PDA synchronization device; and, e) passing said key code data output to said keycode processing module if the communication port is open.

3. The keyboard modification system of claim 1, wherein said keycode processing module comprises the computer implementable steps of:

a) determining if there is data in said keycode data output;

b) determining if the communication port has been open longer than a pre-determined length of time if there is no data in the keycode data output; and, c) copying any data in said keycode data output to provide said variable data.

4. The keyboard modification system of claim 1, wherein said determining module comprises the computer implementable steps of:

a) determining whether the length of said variable data is zero;

b) determining if the first byte of said variable data is positive, if the length of said variable is not zero;

c) translating said variable data to a keydata stream if the first byte of said variable data is positive and if the length of said variable data is not zero, sorting the current byte to memory as a current key down code, removing the current byte from said variable data and setting a loop count variable equal to one;

d) performing an equation on said first byte of said variable data if the first byte of said variable data is negative and if the length of said variable data is not zero, said equation for determining whether the key has been released; and, e) resetting the loop count and removing the current byte from said variable data if the key has been released, otherwise removing the current byte from said variable data without clearing the memory.

5. The keyboard modification system of claim 1, wherein said at least one additional keycode processing module comprises the computer implementable steps of:

a) checking whether memory exists of the key being depressed; and, b) replacing said keydata stream with a different keydata stream if the key has remained depressed, said replacing comprising the steps of:

i) checking the value of the loop count in memory;

ii) seeking the value in a database for a corresponding loop count;

iii) sending a backspace character for each character length of value in the database;

iv) adding 1 to the loopcount;

v) seeking the value in the database for the corresponding loop count; and, vi) sending the keydata stream out to the PDA.

* * * * *